D. M. DEARING.
RUNNING GEAR FOR MOTOR VEHICLES.
APPLICATION FILED NOV. 12, 1909.
1,005,170.
Patented Oct. 10, 1911.
3 SHEETS—SHEET 2.
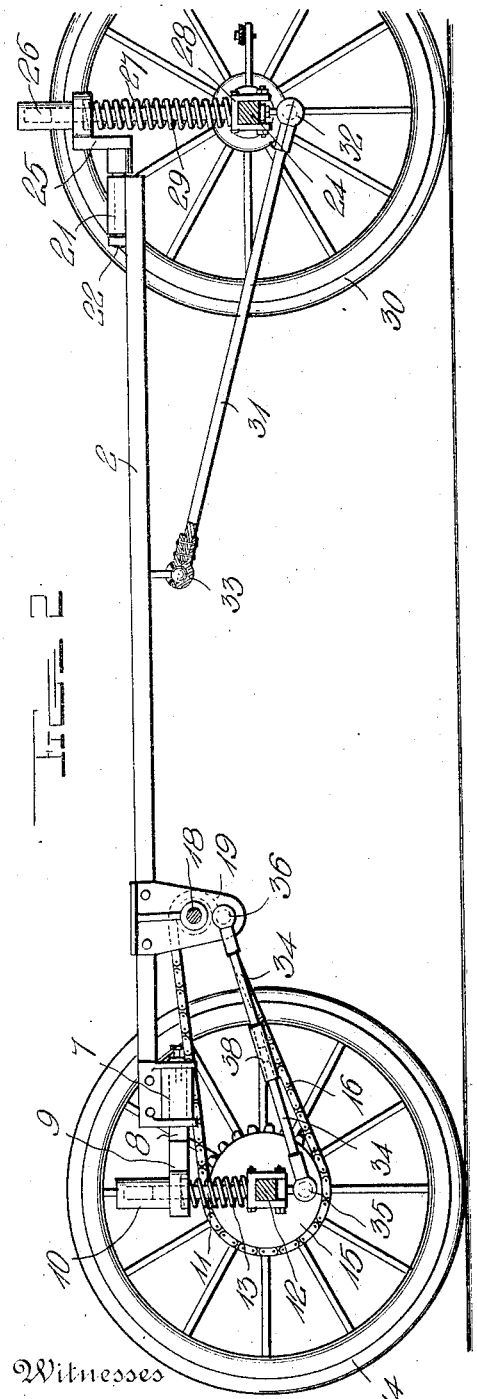
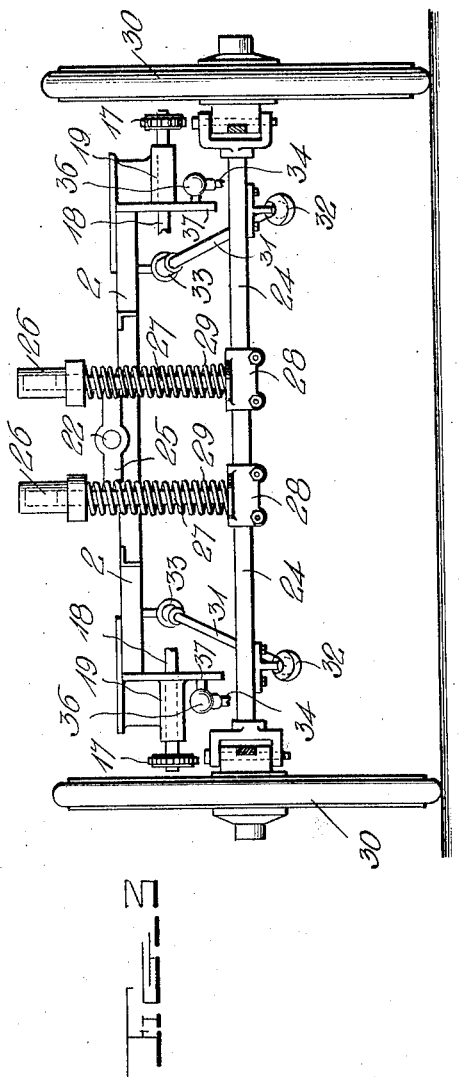
Witnesses
Inventor
David M. Dearing
by H. B. Willson & Co.
Attorneys

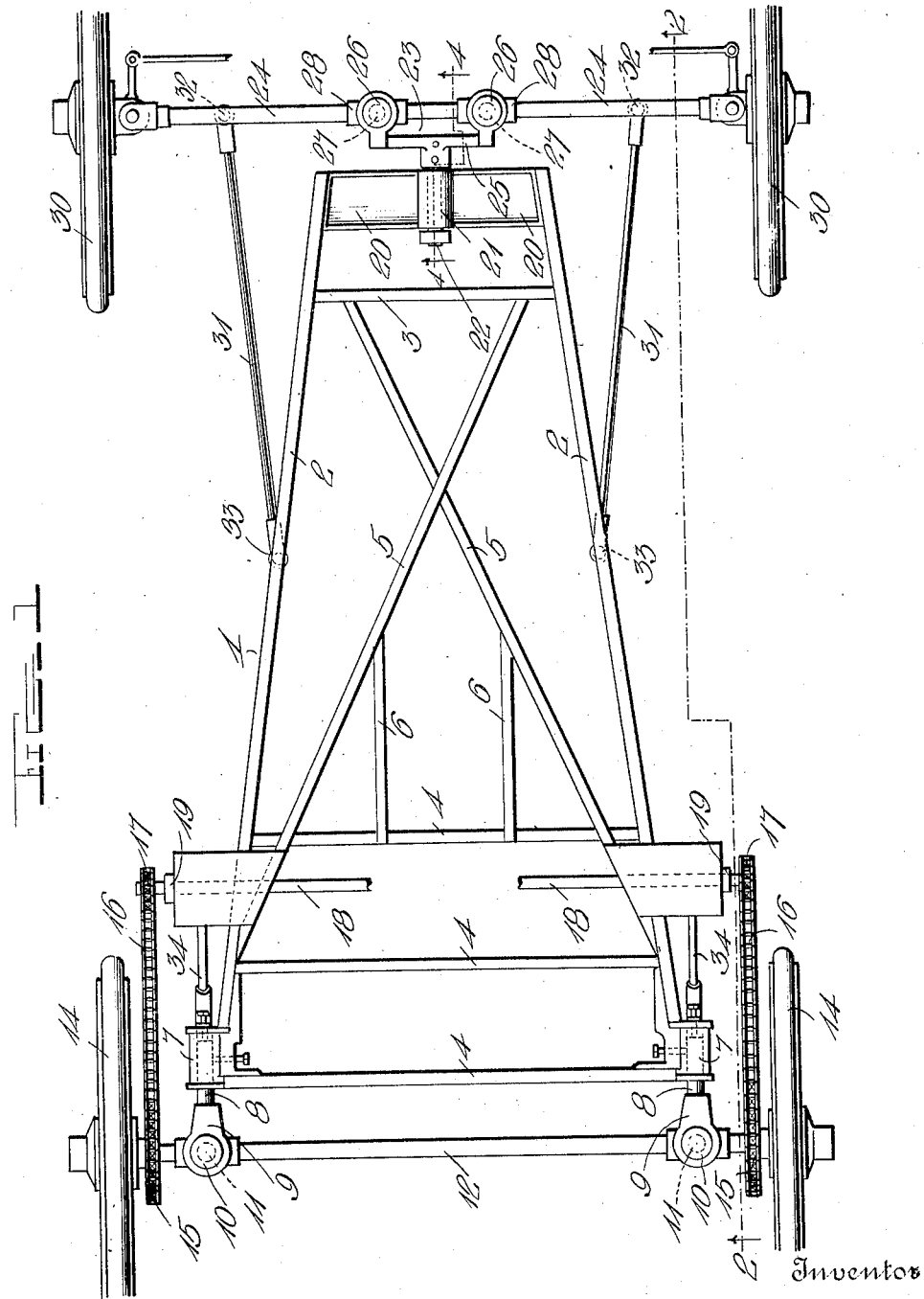

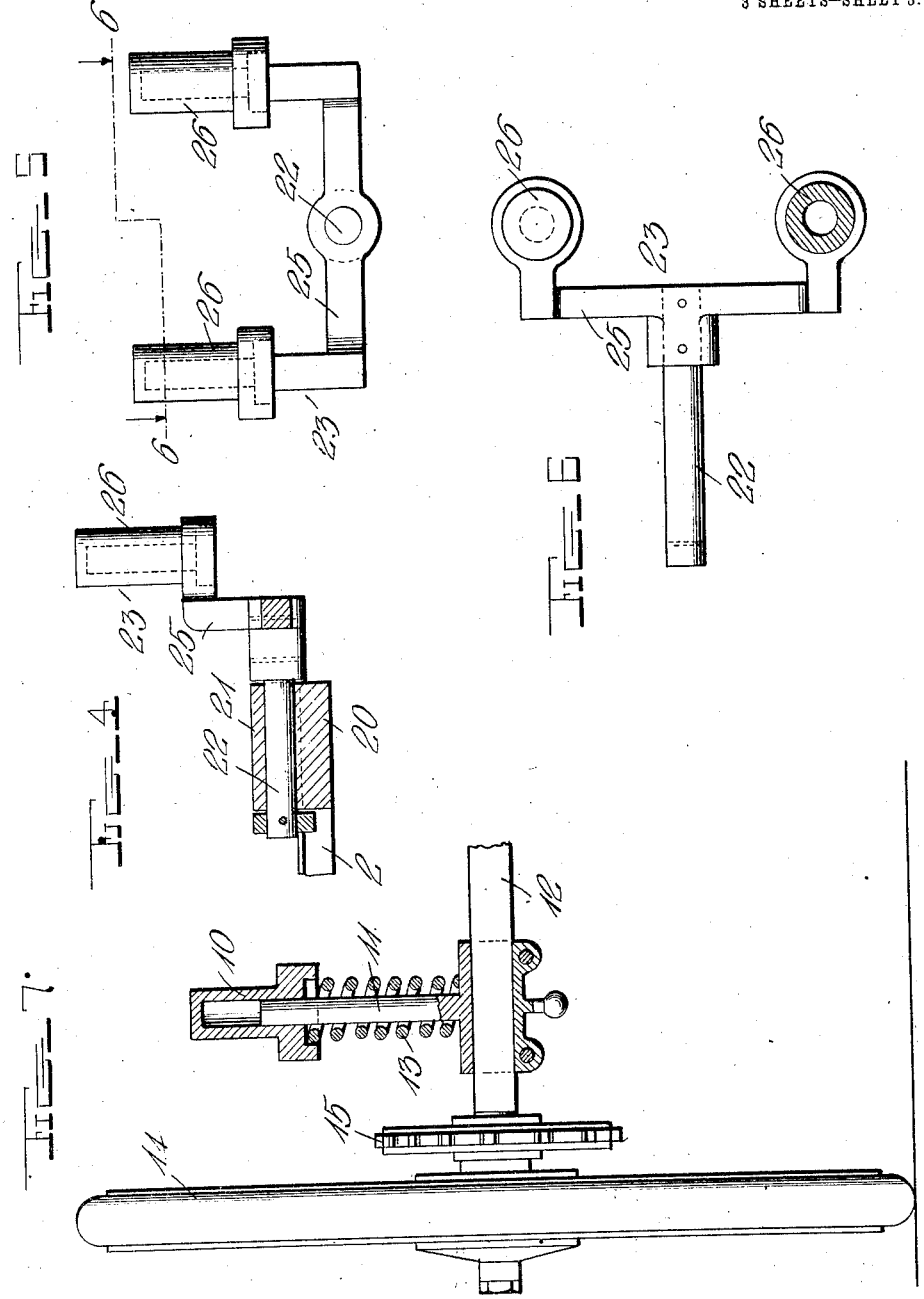

UNITED STATES PATENT OFFICE.

DAVID M. DEARING, OF JACKSON, MICHIGAN.

RUNNING-GEAR FOR MOTOR-VEHICLES.

1,005,170.  Specification of Letters Patent.  Patented Oct. 10, 1911.

Application filed November 12, 1909. Serial No. 527,623.

*To all whom it may concern:*

Be it known that I, DAVID M. DEARING, a citizen of the United States, residing at Jackson, in the county of Jackson and State of Michigan, have invented certain new and useful Improvements in Running-Gear for Motor-Vehicles; and I do declare the following to be a full, clear, and exact description of the invention, such as will enable others skilled in the art to which it appertains to make and use the same.

This invention relates to improvements in running gear for motor vehicles.

One object of the invention is to provide a pivotal yielding connection between the front end of the vehicle supporting frame and the front axle and a yielding connection between the rear end of the frame and the rear axle whereby said frame and other parts of the running gear are relieved of undue strain or twisting.

Another object is to improve the construction and arrangement of the yielding pivotal connection of the running gear shown in U. S. Patent No. 869,881, granted to me November 5, 1907, whereby the weight of the frame and body of the vehicle is distributed on the front axle and the latter thus relieved from pressure at any one point and whereby space is provided to permit the cranking shaft to pass straight in at the center of the machine.

With these and other objects in view, the invention consists of certain novel features of construction, combination and arrangement of parts as will be more fully described and particularly pointed out in the appended claims.

In the accompanying drawings, Figure 1 is a plan view of an improved vehicle running gear constructed and arranged in accordance with the invention, parts being broken away; Fig. 2 is a vertical longitudinal section on the line 2—2 of Fig. 1; Fig. 3 is a front end view of the same, parts being broken away and in section; Fig. 4 is a detail vertical longitudinal section through the front end of the frame and the front axle on the line 4—4 of Fig. 1; Fig. 5 is a front view of the forked or bifurcated weight distributing connection and journal between the front end of the frame and the front axle; Fig. 6 is a top plan view of the same; Fig. 7 is a detail front elevation of a portion of the rear axle with one of the frame supports shown in section.

Referring more particularly to the drawings, 1 denotes the running gear of a motor vehicle consisting of a body supporting frame formed of longitudinally disposed side bars 2, which preferably converge from the rear toward the front end of the machine, as shown. The bars 2 are connected together near their forward ends by a cross bar 3 and at their rear ends by a series of longitudinally spaced cross bars 4. The rear ends of the side bars 2 are connected to the front cross bar 3 by crossed brace bars 5 which extend from the cross bar 3 to near the rear ends of the side bars 2, as shown. The innermost cross bar 4 is connected to the brace bars 5 by short parallel longitudinal bars 6. The cross bars 4 and parallel bars 6 form a support for the motor and driving gear of the vehicle. The motor and driving gear forms no part of the present invention and is therefore omitted from the drawings.

Arranged on the opposite sides of the rear end of the supporting frame are tubular sockets 7 in which are adjustably secured the stems or shanks 8 of rearwardly projecting supporting brackets 9 which are provided with vertically disposed tubular housings or sockets 10, which are open on their lower sides and are adapted to receive the upper ends of guide pins 11, the lower ends of which are secured to the rear axle 12 by clips or other suitable fastening devices.

On the pins 11 between the lower enlarged portions of the housings or sockets 10 and the axle 12 are arranged coiled springs 13 which yieldingly support the weight of the rear end of the frame and the body of the vehicle.

The rear axle 12 is provided with the usual supporting and driving wheels 14, said wheels being provided with sprocket gears 15 which are connected by drive chains 16 to sprocket pinions 17 on the ends of the drive shaft 18, which is journaled in suitable bearings 19 in the rear portion of the frame as shown. The drive shaft 18 is connected to the motor by any suitable power transmitting mechanism not shown.

Arranged between and bolted or otherwise secured to the front ends of the side bars 2 of the supporting frame is a channel iron cross bar or casting 20, in the center of which is formed a horizontal longitudinally disposed journal bearing 21 in which is revolubly mounted the rearwardly extending journal 22 of a weight distributing connection 23, by means of which the front end of the supporting frame is connected to the front axle 24 of the vehicle.

The connection 23 comprises a bifurcated or forked cross head 25, the forked or bifurcated members of which extend upwardly and have formed on their upper ends tubular housings or sockets 26 which are adapted to receive the upper ends of guide pins 27. The lower ends of the guide pins 27 are secured to the front axle 24 at each side of the center of the same by means of clips 28 or other suitable fastening devices. Arranged on the pins 27 between the fastening clips thereof and the lower enlarged ends of the housings or sockets 26 are coiled supporting springs 29 which receive and support the weight of the supporting frame and body of the vehicle, thus providing a yielding support for these parts.

By providing the forked connection between the forward end of the frame and the front axle and attaching said connection to the axle at points on each side of the center of the same, the weight of the vehicle body and supporting frame is evenly distributed on the axle, thus relieving the latter of the entire pressure or weight at any one point. The pivotal connection between the cross head 25 and the front end of the supporting frame permits the ends of the front axle to rock or swing up or down when passing over rough, uneven surfaces, thereby relieving the supporting frame and running gear of twisting strains to which they are subjected in the usual construction of motor vehicle running gear. The springs 29 cushion the weight of the vehicle body on the axle and serve to absorb all jars and shocks imparted to the axle of the vehicle.

The front axle 24 is provided with the usual steering and supporting wheels 30 and said axle is connected near its outer ends to the side bars 2 of the supporting frame by longitudinally extending radius rods or brace bars 31, the forward ends of which have a ball and socket connection 32 with the under side of the axle, while the rear ends of the rods have a ball and socket connection 33 with the side bars to the frame as shown to permit them to move in all directions. The rear axle 12 is also preferably braced by longitudinally disposed inclined radius or brace rods 34 which have a ball and socket connection 35 at one end with the lower side of the rear axle and a similar connection 36 with a bracket 37 on the lower side of the bearing boxes 19 of the drive shaft. In practice the radius rods are so nearly horizontal that there is little fore and aft motion given the axles to which they are connected and the ball and socket joints which connect them.

The brace rods 34 are preferably formed in sections which are adjustably connected together at their inner ends by turn buckles 38, or other suitable connections, whereby said rods may be lengthened or shortened.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a running gear for vehicles, a front supporting axle, a supporting frame terminating at the inner side of said axle, a substantially Y-shaped cross head with the shank thereof rotatably mounted in the forward end of said frame and with the arms arranged in horizontal position and yielding connections between said arms and said axle, said connections being arranged on opposite sides of the center of the axle and radius rods connecting said axle with said frame.

2. In a running gear for motor vehicles, a supporting frame, a front supporting axle arranged beyond the end of said supporting frame, a bifurcated cross head, a journal secured to said cross head, a bearing formed in the front end of said frame to receive said journal whereby said cross head is pivoted to swing in a vertical plane, upright guide pins secured to said axle on opposite sides of the center of the same, cushioning springs arranged on said guide pins, and means whereby said pins are engaged by the bifurcated ends of said cross head, thereby providing a yielding connection between said ends and said axle on each side of the center thereof, whereby the weight of the frame and body of the vehicle is distributed on the axle and whereby the jars and shocks imparted to the axle are absorbed and radius rods connecting said axle with said frame.

3. In a running gear for vehicles a front supporting axle having upright guide pins arranged on opposite sides of the center thereof, a front cross bar provided with a centrally disposed longitudinally extended journaled bearing, a weight adjusting connection arranged between said axle and said supporting frame and comprising a bifurcated cross head having the shank thereof revolubly mounted in said bearing and the bifurcated members extended upwardly and provided with upright tubular housings to receive said guide pins, coiled springs arranged on said pins between said axle and housings and radius rods connecting said axle with said frame.

In testimony whereof I have hereunto set my hand in presence of two subscribing witnesses.

DAVID M. DEARING.

Witnesses:
James S. Allen,
Samuel L. Beck.